United States Patent [19]
Dupre et al.

[11] 4,299,710
[45] Nov. 10, 1981

[54] DRILLING FLUID AND METHOD

[75] Inventors: Jean Dupre, Levittown; William M. Hann, Roslyn, both of Pa.

[73] Assignee: Rohm and Haas Company, Philadelphia, Pa.

[21] Appl. No.: 582,467

[22] Filed: May 30, 1975

[51] Int. Cl.$^3$ .............................................. C09K 7/02
[52] U.S. Cl. .............................. 252/8.5 A; 252/8.5 C
[58] Field of Search ......................... 252/8.5 A, 8.5 C

[56] References Cited

U.S. PATENT DOCUMENTS

| | | | |
|---|---|---|---|
| 2,718,497 | 9/1955 | Oldham et al. | 252/8.5 |
| 2,961,400 | 11/1960 | Park | 252/8.55 |
| 3,018,245 | 1/1962 | Owen | 252/8.5 |
| 3,047,493 | 7/1962 | Rosenberg | 252/8.5 |
| 3,654,164 | 4/1972 | Sperry | 252/8.5 |
| 3,668,122 | 6/1972 | Branscum | 252/8.5 |
| 3,738,437 | 6/1973 | Scheuerman | 252/8.5 |
| 3,852,201 | 12/1974 | Jackson | 252/8.5 |
| 3,878,110 | 4/1975 | Miller | 252/8.5 |
| 3,919,092 | 11/1975 | Norton et al. | 252/8.55 |

FOREIGN PATENT DOCUMENTS

| | | | |
|---|---|---|---|
| 668844 | 8/1963 | Canada. | |
| 913348 | 10/1972 | Canada. | |
| 1244623 | 9/1960 | France. | |
| 6414645 | 6/1965 | Netherlands | 252/8.5 |
| 305251 | 7/1971 | U.S.S.R. . | |

Primary Examiner—Herbert B. Guynn

[57] ABSTRACT

The application discloses a viscous aqueous alkaline drilling liquid (fluid) essentially free of clays, for drilling subterranean wells, and a method of drilling such wells. The fluid is circulated into and out of the well, to flush out drill cuttings. The alkaline composition comprises a combination of the thickeners (a) 10 to 90 parts by weight of an addition polymer of an unsaturated carboxylic acid, preferably in the form of a copolymer with another ethylenically unsaturated monomer, for example a copolymer of a major amount of methacrylic acid and a minor amount of ethyl acrylate, the polymer having a molecular weight of from 125,000 to 12,000,000 solubilized in the aqueous system by an alkali such as sodium carbonate, and (b) 10 to 90 parts by weight of a water soluble polysaccharide, or a water soluble derivative thereof ("polysaccharide" being used herein in a generic sense to include such derivatives) such as hydroxyethyl cellulose, the total amount of (a) plus (b) being 100 parts.

6 Claims, No Drawings

DRILLING FLUID AND METHOD

This invention relates to a low solids, essentially clay-free, viscous, aqueous, alkaline drilling fluid containing (a) a solubilized addition polymer of an ethylenically unsaturated carboxylic acid, preferably as a copolymer with at least one other addition polymerized ethylenically unsaturated monomer, in combination with (b) a water soluble macromolecular polysaccharide or a water soluble derivative thereof. The invention also relates to a method of drilling subterranean wells using said fluid. "Fluid" as used herein means liquid.

BACKGROUND OF THE INVENTION

Drilling fluids are employed in the drilling of oil and gas wells, or other wells. These fluids are circulated down the drill pipe and up the annulus between pipe and formation and serve several functions, the principal ones being removing cuttings, cooling and lubricating the bit, and stabilizing the formation. The most commonly used fluids are "drilling muds" wherein colloidal clays, barites, and similar inorganic solids, at levels of 25–35 pounds per barrel (ppb), a barrel being 42 U.S. gallons, provide thickening and borehole stabilization. These muds have several disadvantages, the more serious ones being appreciably slower drilling rates compared to water alone, inability to stabilize troublesome formations such as heaving and swelling shales, and forming of a filter cake of clay upon loss of water into the formation, (thus clogging the borehole) which interferes with drilling and movement of the drill pipe. For many years, polymers have been added to inorganic muds to modify the properties of the clay such as reducing water loss or increasing thickening; however, the basic limitations of clay based drilling muds remain. More recently, low solids drilling fluids based principally on soluble polymers, with little or no colloidal clays, have been introduced or proposed. Low molecular weight polymers such as of acrylic acid, methacrylic acid and the like, and salts thereof, have been used to modify clay muds; these low molecular weight products (below about 75,000 $\overline{M}v$) do not function as thickeners, and may even detract from the desired properties in a drilling fluid. These soluble polymers, however, have not found universal acceptance because the polymers have not provided all the properties required in a complete drilling fluid. Specifically, it has been found that they do not give optimum effective thickening of fresh and brine waters. Fluids have also been proposed which are essentially free of clay and in which the necessary viscosity is achieved by means of macromolecular polysaccharides, or derivatives thereof. It has been found that the polysaccharides do not stabilize swelling shales and the like, to a great extent.

Examples of references showing the use of either soluble polymers or soluble polysaccharide resins or gums in drilling fluids appear in U.S. Pat. Nos. 3,699,042, 3,852,201, and 3,654,164. Pen'kov et al, Kollordnyii Zhurnal, 35, No. 4, pages 799–801, July, 1973, describe the use of copolymers in drilling fluids, and in other drilling fluids disclose polysaccharides, but not the combination of the two. C.A. 75:119791x shows graft copolymers of carboxymethyl cellulose or alginates with "polyacrylates", apparently in clay-containing drilling muds, as stabilizers. C.A. 60:11808e shows modifying gypsum muds with an acrylate-acrylamide copolymer or with a carboxymethyl cellulose, and discusses the effect of high temperatures on each of these thickeners. In addition to these disclosures, U.S. Pat. No. 3,284,353 discloses carboxymethyl cellulose in drilling muds, Pat. No. 3,654,164 discloses a copolymer of a vinyl ether and maleic anhydride, hydroxyethyl cellulose is disclosed in U.S. Pat. No. 3,852,201, a styrene-maleic anhydride copolymer is disclosed in U.S. Pat. No. 3,332,872, and a copolymer of acrylic acid and acrylamide is disclosed in U.S. Pat. No. 3,323,603. None of these, however, suggest the advantages discovered in accordance with the present invention of using the specified combination of an acid-containing polymer and of a polysaccharide such as hydroxyethyl cellulose, particularly having the specific materials, proportions, and properties of the materials of the invention.

DETAILED DESCRIPTION OF THE INVENTION

It has now been found, as suggested heretofore, that a particular combination of acid-containing polymers and polysaccharides is effective in very small amounts to provide rapid drilling, inhibition of swelling and sloughing of hydratable formations, excellent viscosity, and stability to saturated brines. There are other advantages. The more rapid the drilling, the utilization of drilling rigs becomes more efficient. The reduced quantity of material, 1–2 ppb of polymer versus 25–35 ppb of clay, allows savings in labor as in preparing the drilling fluids and savings in freight costs which is particularly valuable in remote drilling areas such as the North Sea and Alaska.

The composition of the invention is an essentially clay-free viscous aqueous alkaline drilling fluid thickener consisting essentially of the combination of:
 (a) a solubilized addition polymer of an ethylenically unsaturated carboxylic acid and preferably copolymerized with at least one other addition polymerizable ethylenically unsaturated monomer, said copolymer having a critical molecular weight ($\overline{M}v$) of from about 125,000 to about 12,000,000, preferably from about 250,000 to about 5,000,000, and having a critical range of equivalent weight per carboxyl group, as defined herein, of from about 70 to about 250, preferably from about 100 to about 150, and
 (b) a water soluble macromolecular polysaccharide, or a water soluble derivative thereof, capable of thickening aqueous systems, said polysaccharide or derivative having a thickening efficiency such that a solution of 2 percent by weight thereof in distilled water provides a fluid having a critical Brookfield viscosity of from 3,000 to 200,000 centipoises, at about 22° C., using the appropriate spindle, and rotation rate thereof.

The pH of the system must be from about 7 to 14, preferably from about 7.5 to about 13.5, the weight ratio (a) to (b) being from 10 to 90 parts of (a) to 90 to 10 parts of (b), the quantity of (a) plus (b) in the drilling fluid being such as to effect the desired viscosity, which when measured as Fann viscosity, is in the range of 3–40 cps, preferably 5–30 cps, determined at 600 r.p.m. at about 22° C. The components of the fluid are chemically stable under alkaline conditions, and are effective in salt brines.

The total amount of the acid-containing polymer and the polysaccharide is between 0.1 and 5 ppb, preferably between 0.5 and 2 ppb. This corresponds approximately to from 0.0024 to 0.12 pounds per U.S. gallon in the broad range with the preferred range being from approximately 0.012 to 0.048 pounds per U.S. gallon. In terms of grams per liter, this approximates 0.29 g. per liter to an upper limit of 14 g. per liter. The preferred range is approximately 1.4 g. per liter to 5.7 g. per liter. Percents by weight can be determined by simple calculations.

Where the polymer solution, or solubilizing of the polymer is mentioned, it is to be understood that this includes the formation of a colloidal solution of such polymers. Such colloidal solutions appear essentially clear to the eye but do scatter light to some extent and are thus, in the strict sense, not true solutions. For the purposes of this application, referring to them as solutions is considered sufficiently accurate.

The Fann viscosity of the drilling fluid determined at 600 r.p.m. at 22° C. is between 3 and 40 centipoises. The lower level of course is a higher viscosity than water, alone, and the upper limit of 40 centipoises would be used in extreme situations such as in so called "spud muds" requiring an extremely high viscosity. For normal drilling, the Fann viscosity is between about 5 and 30 centipoises. Most preferred is a Fann viscosity of from 5 to 15 centipoises.

The compositions of this invention permit the formulation of clay-free, or substantially clay-free, low solids drilling fluids with the required performance properties. As used herein, the terms "consisting essentially of" the polymer-polysaccharide combination, or "substantially" or "essentially" clay-free, are to be construed as limiting the content of any clay, or equivalent insoluble materials, to relatively low levels such that the character of the composition is not changed. Thus, as long as the basic characteristics of the polymer-polysaccharide drilling fluid are retained, small amounts of other materials may be added without departing from the invention. The invention provides (1) good viscosity in fresh and saturated brine waters to carry cuttings to the surface (2) effective inhibition of hydration of shales to reduce sloughing and swelling, at levels of in the neighborhood of about 1 ppb. One of the major advantages of these viscosifiers and hole stabilizers over colloidal clay is that they do not interfere with penetration of the drill bit and thus allow a high drilling rate. Use of these fluids at 1 ppb of the thickeners of the invention versus 30 ppb for muds having colloidal clays represents a significant reduction in freight and handling to reach the well site and in time and manpower required to prepare the drilling fluids.

Details of the invention will now be discussed.

The unsaturated carboxylic acid in the polymer may be a simple monocarboxylic acid, or may be a half ester or half amide of an $\alpha,\beta$-unsaturated dicarboxylic acid, and soluble salts thereof such as the sodium salt. Examples of copolymerizable ethylenically unsaturated monocarboxylic or polycarboxylic acids are sorbic, cinnamic, vinyl furoic, $\alpha$-chlorosorbic, p-vinylbenzoic, acrylic, methacrylic, maleic, fumaric, aconitic, atropic, crotonic, and itaconic acids, or mixtures thereof, with itaconic acid, maleic acid, fumaric acid and the $\alpha,\beta$-unsaturated monocarboxylic acids, particularly methacrylic acid and acrylic acid, being preferred. Other copolymerizable acid monomers include the alkyl half esters or partial esters of unsaturated polycarboxylic acids such as of itaconic acid, maleic acid, and fumaric acid, or the partial amides thereof. Preferred half esters are the lower alkyl ($C_1$ to $C_6$) esters such as methyl acid itaconate, butyl acid itaconate, methyl acid fumarate, butyl acid fumarate, methyl acid maleate, and butyl acid maleate. Such partial esters and partial amides are considered to be "$\alpha,\beta$-unsaturated monocarboxylic acids," and the term as used herein includes such esters and amides.

The unsaturated acid monomer of the invention may be used as a homopolymer or preferably as a copolymer with substantially any vinyl monomer. The term "vinyl monomer" as used herein means a monomer preferably having less than about 20 carbon atoms comprising at least one of the following olefinically unsaturated groups:

| vinylidene | $CH_2=C<$ |
|---|---|
| vinyl | $CH_2=CH-$, and |
| vinylene (not in an aryl ring) | $-CH=CH-$, | whether homopolymerizable or not. Examples are the esters of $\alpha,\beta$-ethylenically unsaturated monocarboxylic acids, $\alpha,\beta$-ethylenically unsaturated aldehydes, $\alpha,\beta$-ethylenically unsaturated dicarboxylic acid esters, $\alpha,\beta$-ethylenically unsaturated nitriles, hydrocarbons such as $\alpha$-olefins, conjugated diolefins, vinylaryl compounds, vinyl alkyl ethers, unsaturated amides and hydroxyalkyl amides, vinyl halides, vinylidene halides, vinyl sulfides, vinyl acyloxy compounds (esters of saturated carboxylic acids and ethylenically unsaturated alkanols), vinyl ureido monomers, vinyl compounds having heterocyclic nitrogen-containing (HN<) groups, and halogen or hydroxyalkyl substituted derivatives thereof. The methods for the preparation of the aqueous dispersions of vinyl polymers are conventional and form no part of the present invention. For examples of well known methods of preparing vinyl polymers, see "Polymer Processes," Schildknecht, interscience, N.Y. (1956), pp. 111-174. For examples of making these and other suitable high molecular weight soluble polymers, which are useful in the present invention, British Pat. No. 870,994 may be consulted. The disclosure of that patent is hereby incorporated by reference. The thickeners are disclosed for various uses including addition to a red mud for well drilling.

Specific examples of suitable vinyl monomers which may be copolymerized with the acid monomer for use according to the invention are esters of acrylic acid, methacrylic acid, itaconic acid, maleic acid, and fumaric acid with alkanols having 1 to 20 carbon atoms, such as methanol, ethanol, butanol, 2-ethylhexanol, pentadecanol and the like, methyl Cellosolve and Cellosolve acrylates and methacrylates, acrolein, methacrolein, acrylonitrile, methacrylonitrile, ethylene, propylene, isobutene, butadiene, isoprene, chloroprene, styrene, vinyltoluene, vinyl methyl ether, vinyl isobutyl ether, vinyl chloride, vinyl bromide, vinylidene chloride, vinyl sulfide, vinyl acetate, vinyl propionate, $\beta$-hydroxyethyl acrylate and methacrylate, $\beta$-hydroxypropyl acrylate and methacrylate, N-hydroxyethylacrylamide, N-methylolacrylamide, and N-methylolmethacrylamide, acrylamide, and methacrylamide.

Preferred comonomers to be used with the unsaturated acids for making copolymers of the present invention include the esters of acrylic acid and methacrylic acid with a saturated aliphatic alcohol having 1 to 18 carbon atoms, with 0 percent to 30 percent by weight of the total monomers of one or more acid-free ethylenically unsaturated addition polymerizable monomers other than said esters, the preferred ones, if present, being one or more of acrylamide, methacrylamide, the N-methylol derivatives of these amides, hydroxyethyl or hydroxypropyl acrylates and methacrylates, vinyl acetate, vinyl chloride, vinylidene chloride, and vinylaromatic hydrocarbons, especially styrene, and o-, m-, and p-vinyltoluene.

At times it may be desired to modify the polymer by including small amounts of polyunsaturated monomers such as divinylbenzene, ethylene glycol dimethacrylate, diallyl phthalate, allyl methacrylate, and the like. In small amounts these function as crosslinkers to effectively lengthen the polymer chain of the soluble polymer. When used, the amounts are up to about 0.5 parts by weight of the copolymer, the total being 100 parts. The maximum amount is dictated by the requirement that the polymer must be capable of being solubilized by an aqueous alkaline solution. See British Pat. No. 870,994, supra.

In connection with solubilizing the acid-containing polymer, sufficient alkali in the form of potassium or sodium hydroxides, carbonates, or silicates, preferably soda ash (sodium carbonate), is used to achieve this result. Soda ash is the preferred alkali as it provides high viscosity from the polymer more effectively than other alkalies. As an example, utilizing 1 ppb of 50:50 weight mixtures of the copolymer of Example I and Natrosol 250 HHR in 26% NaCl having 6,000 ppm hardness with:

(a) 4 ppb $Na_2CO_3$ gives 16.0 cps (Fann Viscosity at 22° C.)

(b) 4 ppb NaOH gives 11.0 cps (Fann Viscosity at 22° C.)

The mechanism by which soda ash produces higher thickening than other bases is not known, but is believed to be a result of removal of much of the soluble divalent cations (Ca & Mg), by precipitation as carbonate salts, which ions would otherwise modify the thickening efficiency of the polymer, perhaps by salt formation with the —COOH groups of the polymer. While an alkaline pH of from >7 to 14 is useful, the preferred range is from about 7.5 to about 13.5. When the pH is much higher and the drilling fluid becomes relatively hot in use, there may be a tendency to hydrolyze certain of the polymers and degrade the polysaccharide. Where alkyl esters of acrylic acid or methacrylic acid are involved, hydrolysis simply results in increased carboxyl functionality.

While it is helpful if the copolymer is a highly efficient thickener, the principal thickening effect is provided by the polysaccharide, with the polymer performing this function to a lesser extent, while still providing the hydration inhibition of certain geological formations.

The polymers are suitably prepared by emulsion polymerization utilizing for example an anionic surfactant, such as sodium dodecyl benzenesulfonate, and a free radical initiator. The latex is then dried, preferably by spray drying thus providing a suitable powder to be blended with dry polysaccharide and utilized to prepare a drilling fluid, by mixing it with water and an alkali. In some of the preparations of the examples hereinbelow, upon completion of drying of the polymer, cationic diisobutyl phenoxyethoxyethyl dimethyl benzyl ammonium chloride is added in an amount of up to 1.75 parts by weight per 100 parts of polymer solids to reduce foaming of the drilling fluid caused by the anionic emulsifier used in the polymerization.

Substantially any water soluble macromolecular polysaccharide (these are sometimes called resins or gums), particularly a natural carbohydrate or a derivative of a natural carbohydrate, is useful as long as it is stable to the alkaline conditions encountered, is not precipitated or rapidly deteriorated by brines, and provides efficient thickening, particularly in brines. The nonionic cellulose ethers, such as hydroxyethyl cellulose and hydroxypropyl cellulose, having an MS of >1.5, are particularly suitable. Cellulose ethers such as sodium carboxymethyl cellulose and sodium carboxymethyl hydroxyethyl cellulose are also of benefit. The alkyl ethers such as methyl cellulose are not preferred because they form thixotropic gels at elevated temperatures, particularly in the presence of inorganic salts. Natural and synthetic gums are also useful, examples being xahtham gum and crosslinked xantham gum, each as described in U.S. Pat. No. 3,654,164, and polysaccharide derivatives of seaweeds. Some gums are not suitable in that they do not provide adequate viscosity or they are not stable to alkaline conditions or to brines. One such example of an unsuitable polysaccharide gum is untreated guar gum, which is not stable to alkalies.

The following comments apply to the illustrative examples. In the examples, a laboratory test was employed which is indicative of hydration of shales, the phenomenon that leads to weakening, sloughing and swelling of formations being drilled. The test involves measuring the rate and extent of swelling of a bentonite clay in contact with the drilling fluids. Fresh water (no dissolved salt) is used as the medium as it is particularly deleterious to sensitive shales. The extent of swelling of the clay will vary with the specific lot of bentonite clay, as is illustrated by the different clays used in Examples I and IV, as well as test conditions; thus, the relative degree of swelling within a test series is the significant measurement rather than the absolute value. The blend of copolymer and polysaccharide allows appreciably less swelling of clay than does water without polymer. The polysaccharide alone without copolymer is significantly less effective than the blend. (See Table I).

The other key feature of the compositions of this invention is thickening effectiveness, which relates directly to carrying capacity. Viscosity is measured on the Fann Viscometer at 600 rpm, which corresponds to the shear rate encountered in the passage of the drilling fluid and its carried cuttings up the annulus between the drill pipe and the formation or casing. The required viscosity to maintain a clean hole will vary with size of cuttings, pumping rate, width of hole and other factors. The viscosity needed for a given fluid will depend on amount added, concentration of salt present and other ingredients in the drilling fluid. Therefore, relative viscosity under the same conditions is the important factor rather than achieveing a specific viscosity. The data in the examples illustrate the superior thickening efficiency of the blend of copolymer and polysaccharide in saturated brine, a difficult system to thicken. The acid-containing copolymer without polysaccharide, although effective for thickening fresh water and for stabilizing formations (Table I), is not particularly effective for thickening saturated brine (Table II). The relation of viscosity to carrying capacity is also shown. The blend with its higher viscosity requires a significantly lower fluid velocity to carry cuttings in saturated brine than does the copolymer alone. In many situations maintaining a clean hole at a low fluid viscosity is of critical importance. High flow velocity of the drilling fluid can cause excessive erosion of the bore hole or the available pumping equipment may not have the capacity to produce the higher flow velocity necessary with a lower viscosity drilling fluid. Carrying capacity is measured in a laboratory apparatus that recirculates drilling fluid up a glass column containing a pellet with the specific gravity of clays and sand (2.6). The minimum fluid velocity to carry the pellet up the column is determined.

Table III data relate to the cellulosic resin component of the blend. The criteria of suitability is effective thickening of a saturated brine drilling fluid. In Table IIIA, the acrylic copolymer without the cellulosic component shows relatively poor thickening. Blends with as little as 25 parts of cellulosic resin to 75 parts of acrylic copolymer are significantly more effective thickeners. Table IIIB shows several cellulosics that give effective thickening in combination with the acrylic copolymer. An important restriction is that the cellulosic component be a high viscosity material as characterized by having a Broodfield viscosity at 2 percent in distilled water of 3000 cps or higher, at 22° C. Unless otherwise stated, all parts herein are by weight.

Data in Table IV define the acrylic copolymer component of the blend. The criteria used is effectiveness in inhibiting the swelling of clay by water. Table IVA shows that the presence of hydroxyethyl cellulose, (HEC) alone without acrylic copolymer in the drilling fluid is ineffective for preventing swelling of clay by water. Blends with as little as 10 parts of acrylic copolymer to 90 parts of HEC significantly reduce swelling by water. Table IVB shows that with blends of acrylic copolymer and HEC, the ability to inhibit clay swelling decreases with decreasing amount of carboxylic acid content in the copolymer. With 40 weight percent MAA (methacrylic acid) or more, good inhibition of swelling is observed. Table IVC lists a number of copolymers of MAA and other noncarboxyl containing monomers which are effective in inhibiting clay swelling. Table IVD illustrates the effect of molecular weight of the copolymer. Inhibition is less with lower molecular weight but a $\overline{M}v$ of 250,000 still shows significant inhibiting properties.

The copolymer is synthesized by known procedures. A preferred method is by emulsion polymerization as described in the British patent, supra, followed by spray drying to produce a dry powder in the carboxylic acid form. The powdered polymer is dry blended with the polysaccharide powder, and with a low level of defoamer, if needed. The latex may be deionized or otherwise treated. Drilling fluids are prepared by adding the powdered product to water with agitation along with an alkali such as sodium carbonate or sodium hydroxide to neutralize and solubilize the copolymer component. Of course the latex could be neutralized before spray drying. Furthermore, the latex or solution need not be dried to a powder if the source of supply is convenient to the point of use.

As has been indicated, soda ash ($Na_2CO_3$) is the preferred alkali. It serves the function of neutralizing —COOH groups in the polymer to solubilize it as well as to help limit the amount of calcium or other polyvalent ion, the carbonates of which are generally insoluble, as is known in the art. Surprisingly, it has been found that soda ash is much superior to sodium hydroxide in that the drilling fluid is obtained in a more viscous form using the same ingredients, when using the carbonate rather than the hydroxide; the reasons for this are not known.

In the following examples, the hydroxyethyl celluloses and the carboxymethyl cellulose have various degrees of substitution (D.S) of the anhydroglucose unit, i.e., the number of hydroxyls on the anhydroglucose units which are substituted, and of molecular substitution, i.e., since more than one ethylene oxide group (in the case of HEC) can interact to add to a given hydroxyl group on the anhydroglucose unit, the moles of ethylene oxide reacted (MS) are also pertinent. These figures are as follows:

| PRODUCT | DS | MS |
|---|---|---|
| Cellosize QP100M | 1.0 | 1.8 |
| Natrosol 18OHHR | 1.0 | 1.8 |
| Natrosol 25OHHR | 1.5 | 2.5 |
| Cellosize QP15000 | 1.0 | 1.8 |
| Cellosize QP4400 | 1.0 | 1.8 |
| Hi Vis CMC | 1.2 | 1.2 |

The DS is suitably between 0.8 and 1.8, and the MS from 1.0 to 3.0.

As utilized hearinabove, the following definitions and tests apply:

Equivalent Weight per Carboxyl Group

This is defined as the gram molecular weight of copolymer per carboxylic acid group. This parameter is more specific than giving a weight ratio of acid to other monomer, where present, not only because of the wide variation in molecular weights of the monomers, but also because of the variations in relative amounts of carboxyl groups in going from a monocarboxylic acid to a polycarboxylic acid.

Clay Swelling Test

Dry bentonite clay is weighed into a 25 ml graduated cylinder, and the cylinder is tapped until the clay settles to the 5 ml mark (15 mm high). Twenty ml of the drilling fluid is introduced gently into the cylinder and observed after contact with the clay for 30 minutes or 2 hrs. The height of the clay in mm, after contact with the fluid for the indicated interval, minus 15 mm is recorded as clay swelling. In Table I, 5.2 g of Magcogel bentonite was used in each cylinder; in Table IV, 4.0 g of Wyoming bentonite was used. (See footnote in Tables for contact times).

Determination of Molecular Weight by Using Intrinsic Viscosity, $\overline{M}v$ Acrylic ester addition polymers and copolymers are well known to be exceptionally stable to exposure to sunlight and other radiation. This is not the case with addition polymers which have high contents of copolymerized ethylenically unsaturated carboxylic acids. Such products, in the form of solutions, suspensions, or dried powders, should be kept in containers which are impervious to harmful rays such as ultraviolet light, or which filter out said harmful rays, and should be used as soon as possible. Accordingly, the polymers useful in accordance with the present invention should be kept in opaque containers or in containers, such as amber glass, which filter out the harmful rays. Thus, the age and conditions of storage affect the molecular weight of a given polymer useful according to the invention.

The approximate average molecular weight determined by intrinsic viscosity is obtained utilizing a Cannon-Fenske Routine Viscometer, Model 150 J 288. The polymer is dried, as by drying under vacuum at an elevated temperature, or by spray drying. A given amount of the dry polymer is dissolved in 102% sulfuric acid, and a 7 ml sample is poured into the viscometer. The bath in which the viscometer is located, is maintained at 30° C. The average time of flow of samples of the same material is then determined, as well as the time of flow for the sulfuric acid by itself, two samples being used and the average of the two times being utilized. The specific viscosity is then determined therefrom using established procedures, and the molecular weight is approximated.

The following values were obtained for various lots of dried high molecular weight and low molecular weight materials. The molecular weight, as is known, can be deliberately varied by varying the conditions of polymerization. The following tables give the molecular weights of various products used in accordance with the invention. All polymers were prepared by emulsion polymerization. The polymer was dissolved in the sulfuric acid in the concentrations given in Table B, for 16 hours at ambient temperature (20°-22° C.), prior to feeding the 7 milliliters of the solution to the viscometer as noted above, for determining the intrinsic viscosity. In ascertaining the foregoing values, the time for the sulfuric acid solvent and for the solution of the polymer in the acid were obtained as follows:

TABLE A

| LOT NO. | $H_2SO_4$ SOLVENT, SECONDS | SOLUTION OF POLYMER IN $H_2SO_4$, SECONDS |
|---|---|---|
| 1 | 94.3 | 118 |
| 2 | 94.8 | 112.95 |
| 3 | 95.45 | 115.0 |
| 4 | 93.25 | 106.3 |

Lot numbers 1, 2, and 4 were vacuum dried at 80° C. Lot number 3 was a sprayed dried material which had been prepared long prior to its use.

Viscosity of 2% of Solution of Polysaccharide in Distilled Water

Two grams of the polysaccharide is dispersed in 98 g. of distilled water, and the pH of the mixture raised to 10.0. After allowing the resultant solution to stand 24 hours at ambient temperature, viscosity is measured at 22° C. with a Brookfield LVT Viscometer. For the 1% viscosity one gram of the polysaccharide is used with 99 g. of water. The appropriate spindle No. and rotational speed in revolutions per minute (r.p.m.) will depend on the particular viscosity encountered. Thus, with Cellosize QP100M, the speed is three revolutions per minute with spindle No. 4. Using QP4400, the same spindle is used, but the speed is 60 revolutions per minute.

The following examples illustrate the invention, either by actual drilling experiments or by laboratory tests which evaluate the effectiveness of the drilling fluids in actual use.

EXAMPLE I

Fresh water containing 1 ppb of $Na_2CO_3$, the water having a hardness of 500 parts per million, expressed as $CaCO_3$, with no sodium chloride, is used as specified to form solutions of: (a) 1.0 ppb of the hydroxyethyl cellulose (HEC); (b) 1.0 ppb of spray dried, powdered copolymer of methacrylic acid and ethyl acrylate in a weight ratio of 68.5:31.5, the $\overline{M}v$ of which is about 2,130,000 and having an equivalent weight per carboxyl group of 123.5; and in a third fluid, (c) a 50:50 weight mixture of the same copolymer and hydroxyethyl cellulose in a total amount of 1.0 ppb. A blank, (d), a solution of the $Na_2CO_3$ only in the fresh water specified, is also used. These solutions have a pH of about 9.8. The viscosity and extent of clay swelling is determined by the procedures indicated in Table I, or in the case of clay swelling, by the procedure indicated above. Fresh water provides a particularly severe test for clay swelling. The results are illustrated in Table I. A different drilling fluid of 1.0 ppb of the 50:50 weight mixture of the same copolymer and same hydroxyethyl cellulose in fresh water of 500 ppm hardness with 1 ppb of $Na_2CO_3$, and additionally with 1 ppb of NaOH, had a Fann viscosity at 22° C. of 9.8 cps. and a pH of 11.6.

TABLE B

| POLYMER LOT[1] (APPROX. AGE, YRS.) | CONCENTRATION IN SOLVENT g./dl. OF SOLUTION | $\eta$ SPECIFIC[2] VISCOSITY (sv) | $\eta$ INTRINSIC[3] VISCOSITY dl./g. (iv) | ESTIMATED $\overline{M}v$ |
|---|---|---|---|---|
| 1 (1) | .025 | 0.2513 | 9.21 | 3,950,000 |
| 2 (2) | .025 | 0.1915 | 7.17 | 2,850,000 |
| 3 (5) | 0.033 | 0.2048 | 5.73 | 2,130,000 |
| 4 (2) | 0.1 | 0.1399 | 1.33 | 320,000 |

[1]Polymers 1-4 prepared by emulsion polymerization, lot 4 having a higher concentration of initiator to give the lower molecular weight.

[2] $\eta_{sv} = \dfrac{\text{Solution Time} - \text{Solvent Time}}{\text{Solvent Time}}$, or $\eta_{sv} = \dfrac{t_s - t_o}{t_o}$

[3] $\eta_{iv} = \left( \dfrac{\eta_{sv}}{\text{Polymer Conc., g/dl}} \right) \left( 1 - \dfrac{\eta_{sv}}{3} \right)$ Determination of Minimum Fluid Velocity to Carry Cuttings This is accomplished by flowing the fluid upwardly through a cylindrical tube 2.1 cm. in diameter, by means of an adjustable flow pump, with enough velocity to just suspend a spherical pellet, 0.9 cm. in diameter and having a specific gravity of 2.6, the same as clay. The measured flow rate at which the pellet neither rises nor falls is used to calculate fluid velocity.

TABLE I

| Polymer in[1] Drilling Fluid | Clay Swelling[2] mm | Viscosity[3] cps |
|---|---|---|
| (a) No polymer | 13 | 0.8 |
| (b) Hydroxyethyl cellulose[5] | 6 | 11.2 |
| (c) MAA/EA[4] 68.5/31.5 copolymer | 2 | 12.4 |
| (d) 50/50 mix of co- | | |

TABLE I-continued

| Polymer in[1] Drilling Fluid | Clay Swelling[2] mm | Viscosity[3] cps |
|---|---|---|
| polymer and HEC[5] | 2 | 12.9 |

[1]Plus 1.0 ppb (pound per barrel of 42 U.S. gallons) of soda ash.
[2]Magcogel bentonite, 2 hour exposure to drilling fluid, at 22° C., the fluid being gently deposited on top of the clay without agitation, and allowed to soak in.
[3]Fann viscometer, 600 rpm, 22° C.
[4]See footnote to Example IV for monomer identity.
[5]Cellosize QP100M (Union Carbide).

EXAMPLE II

This example is carried out similarly, but with saturated brine containing 26% sodium chloride and having 6,000 parts per million of hardness, expressed as $CaCO_3$. In this case, the viscosity is determined utilizing the same procedure and materials, and the minimum fluid velocity required to carry the cuttings is estimated by the laboratory procedure described above. The results are illustrated in Table II. These solutions have a pH of approximately 10.8. A similar drilling fluid of saturated brine and 6,000 ppm hardness with 1 ppb of a 50:50 mixture of copolymer and HEC with 2 ppb $Na_2CO_3$ has a viscosity of 9.6 cps. and a pH of 7.4.

TABLE II

| Materials in Drilling Fluid[1] | Viscosity cps | Minimum Flow Velocity To Carry Cuttings (feet/minute) |
|---|---|---|
| (a) No polymer | 2.8 | 84 |
| (b) MAA/EA copolymer of Example I | 4.9 | 74 |
| (c) 50/50 mix of copolymer and HEC of Example I | 13.3 | 52 |
| (d) HEC of Example I | 15.5 | 32 |

[1]Plus 3 ppb soda ash and 1 ppb sodium metasilicate.

EXAMPLE III

This example is conducted similarly to the foregoing examples and illustrates variations in the relative quantities, and total quantities, of the polymer utilized in Examples I and II, and of the specified cellulose derivatives. The aqueous system in Example III consists of saturated brine (26% sodium chloride) having 6,000 parts per million (ppm) of hardness with 3 ppb of soda ash. The results are illustrated in Table III.

TABLE III
POLYMER IN DRILLING FLUID

| MAA/EA Copolymer of Example I ppb | ppb | Cellulosic Component product | composition[2] | 2% viscosity[3] | Viscosity[4] of drilling fluid |
|---|---|---|---|---|---|
| A. Ratio of Copolymer to Cellulosic | | | | | |
| (a) 1.0 | 0 | — | — | — | 3.6 |
| (b) 0.75 | 0.25 | Cellosize QP100M | HEC | 100,000 (4/3) | 6.2 |
| (c) 0.5 | 0.5 | Cellosize QP100M | HEC | 100,000 (4/3) | 10.1 |
| B. Various Cellulosics | | | | | |
| (d) 0.5 | 0.5 | Natrosol 18OHHR | HEC | 90,000 (4/3) | 10.3 |
| (e) 0.5 | 0.5 | Natrosol 25OHHR | HEC | 4,000 (4/30)[5] | 10.2 |
| (f) 0.5 | 0.5 | Cellosize QP100M | HEC | 100,000 (4/3) | 10.1 |
| (g) 0.5 | 0.5 | Cellosize QP15000 | HEC | 15,000 (4/12) | 10.1 |
| (h) 0.5 | 0.5 | Cellosize QP4400 | HEC | 5,000 (4/60) | 6.5 |
| (i) 0.25 | 0.75 | Hi Vis CMC | CMC | 6,000 (4/60) | 7.1 |

[1]Cellosize - Union Carbide Trademark; Natrosol - Hercules, Inc. Trademark; See specific products described in specification.
[2]HEC - Hydroxyethyl Cellulose; CMC - Sodium Carboxymethyl Cellulose.
[3]2% HEC or CMC by weight in distilled water, Brookfield Viscometer, cps., at 22° C. (spindle number/r.p.m.).
[4]Fann Viscometer, 600 r.p.m., cps. at 22° C.
[5]As in footnote 3, but using 1% polymer (would be higher viscosity at 2% concentration).

EXAMPLE IV

The procedure used in this example is essentially the same as used heretofore, with the noted modifications. This illustrates the adaptability of polymers of ranges of molecular weights, the effect of varying ratios of hydroxyethyl cellulose to copolymer, the effect of the relative amount of carboxylic monomer in the polymer, as well as the flexibility of using various other monomers, and the effects of these values on clay swelling. Table IV gives the results.

TABLE IV
POLYMER IN DRILLING FLUID[1]

| ppb of HEC[2] | ppb | POLYMER monomer | Composition[3] weight ratio of monomers | Equivalent[4] Weight | Clay Swelling[5] mm |
|---|---|---|---|---|---|
| A. Effect of Relative Amounts HEC and Polymer | | | | | |

TABLE IV-continued

POLYMER IN DRILLING FLUID[1]

| ppb of HEC[2] | ppb | POLYMER Composition[3] monomer | weight ratio of monomers | Equivalent[4] Weight | Clay Swelling[5] mm |
|---|---|---|---|---|---|
| (a) 1.0 | 0 | — | — | 124 | 32 |
| (b) 0.9 | 0.1 | MAA/EA | Polymer of Example I | 124 | 11 |
| (c) 0.75 | 0.25 | MAA/EA | Polymer of Example I | 124 | 11 |
| (d) 0.5 | 0.5 | MAA/EA | Polymer of Example I | 124 | 7 |
| (e) 0 | 1.0 | MAA/EA | Polymer of Example I | 124 | 6 |
| (f) 0.25 | 0.75 | MAA/EA | Polymer of Example I | 124 | 8 |
| B. Effect of Level of Carboxylic Monomer in Copolymer | | | | | |
| (g) 0.5 | 0.5 | MAA/EA | Polymer of Example I | 124 | 7 |
| (h) 0.5 | 0.5 | MAA/EA | 40/60 | 215 | 15 |
| (i) 0.5 | 0.5 | MAA/BA/CA/DAP | 30/12/57.8/0.2 | 286 | 31 |
| (j) 0.5 | 0.5 | AA/AM | 70/30 | 103 | 11 |
| (k) 0.5 | 0.5 | MA/MVE | 67/33 | 101 | 16 |
| (l) 0.5 | 0.5 | MAA/EA | 40/60 | 215 | 15 |
| C. Variations in Non-Carboxylic Monomer in Polymer | | | | | |
| (m) 0.5 | 0.5 | MAA/EA | Polymer of Example I | 124 | 7 |
| (n) 0.5 | 0.5 | MAA/EA/VAc | 69/21/10 | 124 | 10 |
| (o) 0.5 | 0.5 | MAA/EA/S/ALMA | 60/19.8/20/0.2 | 143 | 16 |
| (p) 0.5 | 0.5 | MAA/BA/MCA/DAP | 40/40/19.8/0.2 | 215 | 15 |
| D. Approximate Molecular Weight ($\overline{M}v$) of Polymer | | | | | |
| (q) 0.5 | 0.5 | MAA/EA (Same as Example I) | 68.5/31.5 2,130,000 | 124 | 7 |
| (r) 0.5 | 0.5 | MAA/EA | 68.5/31.5 320,000 | 124 | 13 |

[1] 1.0 ppb total of polymer and/or HEC in water containing 500 ppm hardness and 1.0 ppb soda ash.
[2] Cellosize QP4400.
[3] MAA-methacrylic acid; EA-ethyl acrylate; VAc-vinyl acetate; S-styrene; ALMA-allyl methacrylate; BA-butyl acrylate;- CA-Cellosolve acrylate; MCA-methyl cellosolve acrylate; DAP-diallyl phthalate; AA-acrylic acid; AM-acrylamide; MA- maleic acid, MVE-methyl ether.
[4] Gram molecular weight of copolymer per carboxylic acid group.
[5] Wyoming Bentonite, 30 minute exposure to drilling fluid. (Note: This is a different clay than used in Example I, thus the difference in the swelling values.)

EXAMPLE V

A field experiment, utilizing the composition of Example I, a 50/50 blend of the copolymer and HEC of Example I, is tested in a drilling fluid used to drill 3,000 feet of hole 7⅞ inches in diameter in the Permian Basin oil field in west Texas. At levels of 0.3–0.8 ppb of the blend in fresh water with 1 ppb of soda ash, effective thickening and carrying up of cuttings is observed. Upon drilling through a salt bed at about the 1800 foot depth, where the drilling fluid becomes saturated with salt, viscosity and carrying ability are maintained without significant change. No indications of sloughing or swelling of shales are observed. A relatively rapid drilling rate of 40 ft./hr. is maintained, comparable to similar portions of holes drilled in the same area with water alone, and faster than neighboring holes drilled with high solids clay-containing drilling fluids.

We claim:

1. A viscous aqueous alkaline drilling fluid containing thickeners consisting essentially of the combination of:
   (a) a solubilized addition copolymer of an ethylenically unsaturated carboxylic acid with at least one other addition polymerizable ethylenically unsaturated monomer, said copolymer having a molecular weight, $\overline{M}v$, of from about 250,000 to 5,000,000 and having an equivalent weight per carboxyl group as defined herein of from over 100 to about 250, and
   (b) a water soluble macromolecular polysaccharide capable of thickening aqueous systems, said polysaccharide selected from at least one hydroxyethyl cellulose and hydroxypropyl cellulose and having a thickening efficiency such that a solution of 2 percent by weight in distilled water provides a fluid having a Brookfield viscosity at 22° C. of from 3,000 to 200,000 centipoises, the pH of the system being alkaline and from about 7 to 14, the weight ratio of (a) to (b) being from 10 to 90 parts of (a) to from 90 to 10 parts of (b), the quantity of (a) plus (b), in the drilling fluid, being between 0.1 to 5 pounds per barrel of drilling fluid and being such as to effect a Fann viscosity of between 5 and 30 cps. at 600 r.p.m. and 22° C., the fluid components remaining chemically stable under alkaline conditions and being effective in salt brines, and the alkalinity is provided by at least one of sodium carbonate and sodium hydroxide.

2. The composition of claim 1 in which the polysaccharide is hydroxyethyl cellulose and the copolymer contains one or more of itaconic acid, acrylic acid and methacrylic acid as the acid component.

3. The composition of claim 2 in which the copolymer contains at least one of said acids and an ester of acrylic acid or methacrylic acid, with up to 30 percent by weight of the copolymer being from one or more acid-free ethylenically unsaturated addition-polymerizable monomers other than said esters, and being free of clay.

4. In a method of drilling a subterranean well wherein a drilling fluid is circulated into and out of said well while drilling said well, the improvement of utilizing as said drilling fluid the composition of claim 1.

5. In a method of drilling a subterranean well wherein a drilling fluid is circulated into and out of said well while drilling said well, the improvement of utilizing as said drilling fluid the composition of claim 2.

6. In a method of drilling a subterranean well wherein a drilling fluid is circulated into and out of said well while drilling said well, the improvement of utilizing as said drilling fluid the composition of claim 3.

* * * * *